United States Patent [19]

Phillips

[11] Patent Number: 5,400,885
[45] Date of Patent: Mar. 28, 1995

[54] RETAINED KEY SHAFT MOUNTING ASSEMBLY

[75] Inventor: Allyn E. Phillips, Simpsonville, S.C.

[73] Assignee: Reliance Electric Industrial Company, Greenville, S.C.

[21] Appl. No.: 27,812

[22] Filed: Mar. 8, 1993

[51] Int. Cl.⁶ .................. B60K 41/26; F16D 63/00
[52] U.S. Cl. .................. 192/8 R; 188/82.77; 403/356; 403/369
[58] Field of Search .............. 74/576, 577 R; 192/7, 192/8 R, 104 C; 188/82.77; 403/355, 356, 369

[56] References Cited

U.S. PATENT DOCUMENTS

| | | | |
|---|---|---|---|
| 1,612,769 | 12/1926 | O'Connell | 403/356 X |
| 2,049,111 | 7/1936 | Dunham | 192/8 R |
| 2,543,482 | 2/1951 | Williams | 192/7 |
| 2,591,253 | 4/1952 | Grismore | 403/356 X |
| 2,681,239 | 6/1954 | Gillen | 403/356 |
| 2,750,007 | 6/1956 | Turner et al. | 188/82.77 |
| 3,368,833 | 2/1968 | Chung | 403/356 |
| 4,697,672 | 10/1987 | Linton | 192/7 X |

FOREIGN PATENT DOCUMENTS 258620  4/1913  Germany .............. 403/356

OTHER PUBLICATIONS

Erik Oberg, Franklin D. Jones, Holbrook K. Horton and Henry H. Ryffel, *Machinery's Handbook*, 24th Edition, Title page and pp. 2247–248, 2258, 2263–2264, 2267–2268 and 2270 (1992).

A portion of a brochure entitled "Line–O–Power Helical Reducers and Gearmotors," published by Foote-Jones/Illinois Gear Div. of Regal-Beloit Corp., 2102 N. Natchez Ave., Chicago, Ill 60635, apparently dated Apr. 1992.

A catalog entitled "Formsprag: Over-Running Clutches," publsihed by Warner Electric, 449 Gardner Street, South Beloit, Ill 61080 Title page and pp. 1 through 34.

A pamphlet entitled, "Dodge Maxum-Concentric Speed Reducers," publsihed by Reliance Electric Co., P.O. Box 499, 6040 Ponders Court, Greenville, S.S. 29602, dated 1992.

*Primary Examiner*—Allan D. Herrmann
*Attorney, Agent, or Firm*—Dority & Manning

[57] ABSTRACT

An improved keyed adapter assembly for securing a component to a rotatable shaft, the adapter assembly including an adapter member with an interior end face and an opposite exterior end face, the adapter member including an outer surface for receipt of a component therein, and an internal bore for receipt of a rotatable shaft therethrough. The internal bore includes a keyway therein. The adapter assembly also includes a key for securing the adapter for rotation with the rotatable shaft, the key including a longitudinal portion extending in the direction of the shaft, and tab portion extending outwardly with respect to the longitudinal portion. The tab portion is adapted to engage the interior end face of the adapter member when the adapter assembly is mounted on a shaft, such as the shaft of a gear reducer.

19 Claims, 2 Drawing Sheets

RETAINED KEY SHAFT MOUNTING ASSEMBLY

BACKGROUND OF THE INVENTION

The present invention relates generally to a keyed adapter assembly for securing components to a rotatable shaft, and more particularly to an improved backstop for preventing reversal of shaft rotation in a gear reducer or the like.

While the following specification will be directed to a backstop for a gear reducer, it should be appreciated that this is merely exemplary and that the invention has applicability for mounting components on rotatable shafts without regard to the particular component. A backstop is referred to throughout the specification for the purpose of simplifying and understanding of the present invention and should not be construed as limiting the scope of the present invention as set forth in the appended claims.

Many devices are secured for rotation with a shaft through use of a keyway in the shaft, an adapter with a keyway that receives the component to be mounted to the shaft and a key. One problem inherent in this type arrangement is movement of the key with respect to the keyway which may cause the adapter and component to become loose with respect to the shaft and thus potentially damage the component and the entire system.

With particular description now directed to a backstop mechanism, in a gear reducer or the like which is being utilized for example on an uphill or inclined conveyor, it is desirable to prevent the reducer from turning backwards or in the reverse direction when the motor turning the gear reducer is stopped. To prevent such reverse movement, backstops have been utilized in the past that allow free rotation in the predetermined direction of rotation of the shaft, but when such rotation is stopped, serve to prevent rotation of the shaft in the reverse direction.

One problem inherent in such known backstop devices is suitable mounting of the backstop to the shaft of the gear reducer. A keyed mounting system has been utilized in the past, but it is possible for the key to work its way out of the appropriate location during use, thus creating an unstable and ineffective backstop with all of the problems attendant thereto.

SUMMARY OF THE INVENTION

The present invention recognizes and addresses the foregoing disadvantages, and others of known shaft mounting systems and backstops.

Accordingly, it is an object of the present invention to provide an improved assembly for securing a component to a rotatable shaft.

It is another object of the present invention to provide an improved backstop assembly for preventing reversal of shaft rotation in a gear reducer or the like.

It is another object of the present invention to provide an economical and effective mechanism for securing components to a rotatable shaft.

It is yet another object of the present invention to provide an improved speed reducer with a backstop for preventing reversal of shaft rotation.

It is another object of the present invention to provide an effective, improved key for use in shaft and adapter keyways for securing components to a shaft.

These and other objects are achieved by providing an improved keyed adapter assembly for securing a component to a rotatable shaft, the adapter assembly comprising an adapter member including an interior end face and an opposite exterior end face, the adapter member including an outer surface for receipt of a component thereon and an internal bore for receipt of a rotatable shaft therethrough. The internal bore includes a keyway therein. The adapter assembly also includes a key for securing the adapter for rotation with the rotatable shaft, the key including a longitudinal portion extending in the direction of the shaft, and a tab portion extending outwardly with respect to the longitudinal portion. The tab portion is adapted to engage the interior end face of the adapter member when the adapter assembly is mounted on a shaft.

These and other objects are also accomplished by providing an improved backstop for preventing reversal of shaft rotation in a gear reducer or the like, the backstop comprising a ratchet adapted to be fixedly attached to a gear reducer housing and including a bore for receipt of a gear reducer shaft therethrough. The backstop also includes a rotating hub including a bore therethrough for receipt of the reducer shaft, the hub including dog assemblies for engagement with the ratchet when the shaft attempts to rotate in a predetermined direction. The backstop further includes an adapter for mounting the rotating hub onto the shaft, the adapter including a keyway for receipt of a key therein, the adapter also including an interior end face on the end of said adapter extending into the backstop, and an exterior face on the opposite end. The backstop further including a key for securing the adapter for rotation with the shaft, the key including a longitudinal portion extending in the direction of the shaft and a tab portion extending outwardly with respect to the longitudinal portion, the tab portion adapted to engage the interior end face of the adapter when the backstop is assembled on a reducer shaft to prevent the key from moving in the keyway in the direction of the exterior end face.

The adapter may be a tapered adapter and the shaft may be the high speed input shaft of a gear reducer. The keyway may include a tapered portion to mate with the tapered portion on the key for engaging the keyway tapered portion to prevent movement of the key. The keyway in the shaft may also be end milled and not have the tapered end; in that case, the end of the key would not have the tapered relief.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
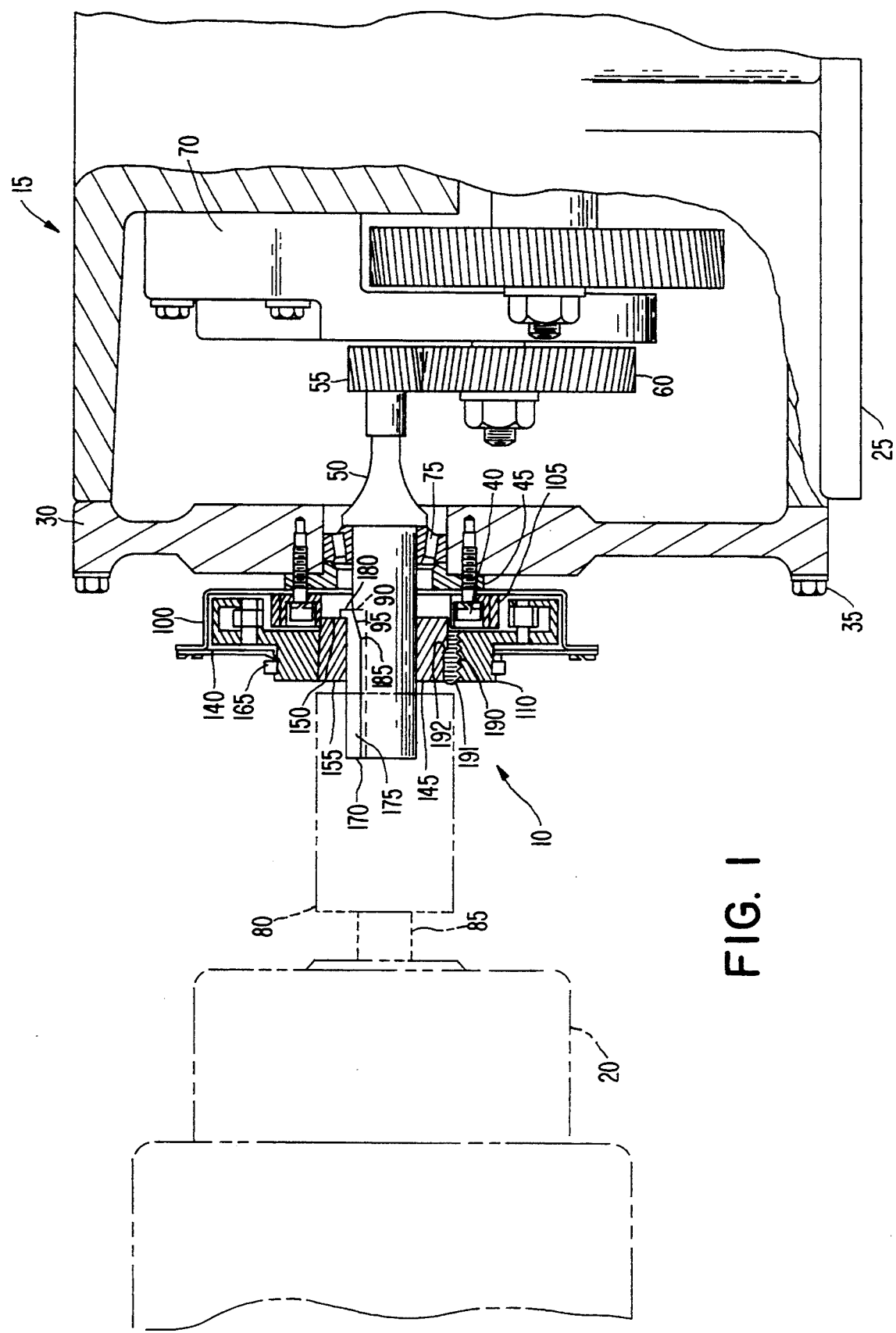
FIG. 1 is a side view of an embodiment of the present invention with parts broken away and showing a motor shaft coupling in phantom.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Referring to FIG. 1, an improved backstop for preventing shaft rotation in a gear reducer or the like in accordance with an embodiment of the present invention is generally illustrated at 10. Backstop 10 is adapted to be connected between a gear reducer 15 and a prime mover such as motor 20 to prevent reversal of shaft rotation when the motor operation is ceased and there is a force on the gear reducer that would cause it to reverse. As discussed above, while an embodiment of the present invention is described with respect to a backstop, it should be appreciated that the present invention has general applicability to securing components such as pulleys, sprockets and the like to shafts through the below described keying mechanism.

Referring again to FIG. 1, gear reducer 15 includes a reducer housing 25 with an end plate 30 that is removably secured to the reducer housing through bolts 35. Backstop 10 is secured to gear reducer housing 25 by securing means 40. As illustrated herein, securing means 40 are bolts that extend into the reducer housing 25. Backstop 10 is mounted to reducer housing through an input shaft seal cover 45 for preventing dirt and debris from entering the reducer housing.

Reducer 15 is illustrated with the high speed input shaft 50 integral with pinion 55 which meshes with gear 60 which ultimately transmits power to a low speed output shaft in a conventional manner, the output shaft not being illustrated herein. Supporting the internal gearing in the gear reducer 15 is an internal housing support 70 that provides the structural integrity to the internal gearing mechanism.

High speed shaft 50 is supported in bearings, one of which is illustrated at 75, in the end plate 30 of reducer housing 25, the other located within the housing 25 of gear reducer 15, but not illustrated. High speed shaft 50 extends through end plate 30 and is adapted to engage a motor shaft coupling 80 that operatively connects high speed input shaft 50 to motor shaft 85 of motor 20. Shaft 50 includes a longitudinally extending keyway 90 for receipt of a key therein. The portion of keyway 90 that is closest to reducer end plate 30 is tapered in this embodiment, as illustrated at 95, to mate with a tapered portion on the shaft key. It should be appreciated that a square end keyway could be utilized without the tapered portion depending on the configuration of the key that is desired to be used, or any other suitable type of keyway.

Figure 2:
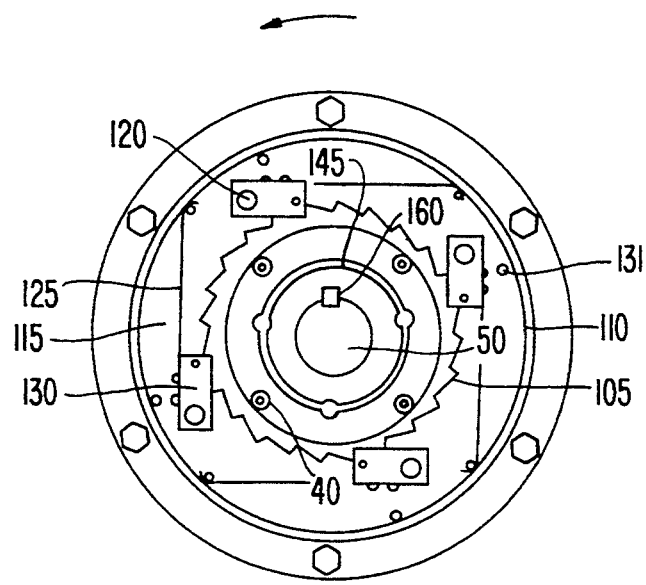
FIG. 2 is an end view showing the dog and ratchet arrangement with parts omitted for clarity.

As illustrated in FIGS. 1 and 2, backstop 10 includes a back plate 100 and a fixed ratchet 105. As can best be seen in FIG. 2, ratchet 105 includes teeth that are oriented for shaft rotation in a counterclockwise direction in the illustrated embodiment. It should be appreciated that shaft rotation in either direction may be utilized with the orientation of the teeth of the ratchet and dog spring assemblies being reversed depending on the desired rotation. Ratchet 105 and back plate 100 are fixedly secured to reducer housing 25 through securing means 40 with an intermediate input shaft seal cover 45 as set forth above.

Backstop 10 further includes a rotatable hub 110 which is adapted to be rotatably mounted on shaft 50. As best illustrated in FIG. 2, rotatable hub 110 includes dog spring assemblies 115 that are pivoted within the rotatable hub as illustrated at pivots 120. Dog spring assemblies 115 include flat springs 125 and dog portions 130 mounted thereon. Rotating hub 110 includes holes (not shown) defined therein. Pins (not illustrated) may be inserted in the holes in the hub assembly 110 at a position where dogs 130 are out of engagement with ratchet 105 for the purpose of assembling the rotatable hub onto the shaft and backstop assembly. After the rotatable hub 110 is put in place, the pins are removed from the holes to allow the location of the dogs to be controlled by the force of flat springs 125. Backstop 10 also includes a front cover plate 140 for protecting the internal workings of the backstop 10.

Rotatable hub 110 is adapted to be mounted on shaft 50 through an adapter 145. Adapter 145 includes an interior end face 150 and an exterior end face 155, interior and exterior being used as a matter of convenience to give directional orientation, the interior being the portion that extends into the interior of the backstop and the exterior being the end face that does not. Adapter 145 includes an internal bore with a keyway therein as best illustrated in FIG. 2 at 160. Adapter keyway 160 is designed to align with shaft keyway 90 so that a key may be placed therebetween to lock the adapter and shaft into rotation together so that torque is transmitted between the shaft and hub. Rotatable hub 110 is secured to adapter 145 so that rotatable hub 110 will rotate with shaft 50 when motor 20 rotates shaft 50. Mounted external of the front cover plate on backstop 10 is a V-ring seal 165 for protecting backstop 10. In a preferred embodiment, adapter 145 is a tapered adapter as is well known in the art and includes means for securely fastening said adapter to shaft 50. In such an embodiment, hub 110 has a tapered internal bore for receipt on said tapered adapter.

One such tapered adapter is mounted as follows. Rotatable hub 110 has threaded holes with threads 190 therein about its internal bore. Adapter 145 has unthreaded half holes located opposite the threaded holes in hub 110. To mount hub 110 to shaft 50 after key 170 has been inserted, set screws 191 are threaded into hub 110 to mate with threads 190. When the set screws are rotated a certain amount, the ends of the set screws reach and engage an abutment 192 at the bottom portion of the unthreaded half holes in the adapter 145. Rotation of the set screws thereafter pulls hub 110 onto adapter or bushing 145 to seat said hub 110 onto shaft 50. A jackscrew mechanism may be utilized to demount the backstop as is well known in the art.

Figure 3:
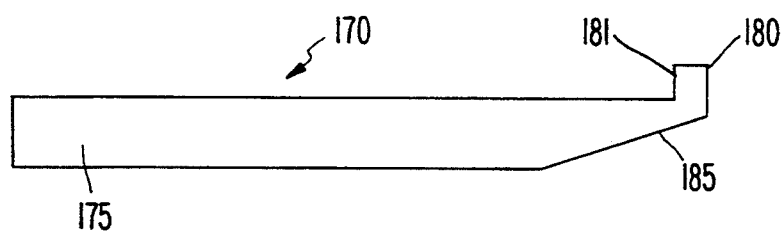
FIG. 3 is an enlarged side view of an embodiment of the retained key of the present invention.
Figure 4:
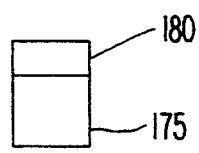
FIG. 4 is an end view of the key of FIG. 3.

As best illustrated in FIGS. 1 and 3, a retained key 170 is utilized to interact between shaft keyway 90 and adapter keyway 160 to secure shaft 50 and adapter 145 for rotation together. Shaft key 170 includes a longitudinal portion 175 and a tab portion 180. Tab portion 180 extends outwardly with respect to longitudinal portion 170 in a radial direction and interacts with interior end face 150 of adapter 145. In addition, shaft key 170 may include a tapered section 185 on the longitudinal portion 175 which configuration is commonly referred to as a sled runner type configuration. In such an embodiment, shaft keyway 90 may also include a tapered portion for mating therewith to prevent shaft key 170 from moving in the direction of the reducer housing. As best illustrated in FIG. 4, in a preferred embodiment, the width of longitudinal portion 175 and tapered portion 185 is substantially uniform along the length of key 170. In a preferred embodiment, key 170 will slide freely in keyway 90 prior to seating the backstop on the shaft. In operation, tab 180 prevents shaft key 170 from moving in the direction of motor 20 because of the interaction between side section 181 of tab 180 and internal end face 150 of adapter 145.

Shaft key 170 may extend farther than the length of adapter 145 so that motor shaft coupling 80, which may include a keyway therein also, may engage with the same key as with shaft key 170 for coupling said motor shaft 85 to reducer shaft 50 therefore providing additional integrity to the mounting system through the backstop. While tab portion 180 is illustrated as extending radially outwardly with respect to the shaft, it should be appreciated that it could extend in any direction that would abut the adapter or component to maintain the key in place.

Backstop 10 operates as follows when in use as can perhaps most clearly be seen from FIG. 2. Rotatable hub 110 is secured for rotation with shaft 50 as set forth above. The direction of teeth of ratchet 105 as well as the orientation of dog spring assemblies 115 is predetermined by the direction of rotation of shaft 50. For example, the configuration illustrated in the present drawings is for counterclockwise rotation of shaft 50. During low speed turning of shaft 50 and therefore hub 110, dogs 130 ride along the sloped portions of ratchet 105 and are moved radially outwardly thereby. As the speed of rotation of rotatable hub 110 is increased, the centrifugal force overcomes the bias of springs 125 to pivot dogs 130 about pins 120 to move dogs 130 completely out of contact with ratchet 105. Abutment pins 131 are also provided to abut dog portions 130 when the dog spring assembly pivots out of engagement with the ratchet. As hub 110 slows down, dogs will move back into contact by virtue of the bias of springs 125 with ratchet 105 as described above. When shaft 50 attempts to reverse, such as when motor 20 ceases to turn shaft 50 and a load is applied back through the reducer, dogs 130 will engage the flat portions of ratchet 105 and thereby prevent further rotation of hub 110 and therefore shaft 50 in the reverse direction.

While the invention has been described with respect to the illustrated backstop, it should be appreciated that adapter 145 could carry one of a variety of mechanical components, such as a pulley or sprocket. Furthermore, in certain instances, adapter 145 could merely be the hub of a component such as the pulley or the like with tab portion 180 of retained key 170 engaging the internal face of such hub. In this regard, it should be appreciated by one skilled in the art that various types of adapters or sections of components that serve a similar function, as well as various types of backstops, are within the scope of the present invention. Further, while backstop 10 is illustrated attached to the high speed input shaft of the reducer, it should be appreciated that it could be attached to other of the reducer shafts or other shafts.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An improved backstop for preventing reversal of shaft rotation in a mechanical device having a rotatable shaft, said backstop comprising:

a ratchet adapted to be fixedly attached to a gear reducer housing and including a bore for receipt of a gear reducer shaft therethrough;

a rotating hub including a bore therethrough for receipt of said reducer shaft therethrough, said hub including dog assemblies for engagement with said ratchet when said shaft is rotated in a predetermined direction;

an adapter for mounting said rotating hub onto said shaft, said adapter including a keyway for receipt of a key therein, said adapter including an interior end face on the end of said adapter extending into said backstop, and an exterior end face on the opposite end; and a unitary key for securing said adapter for rotation with said shaft, said key including a longitudinal portion extending in the direction of said shaft and a tab portion extending outwardly with respect to said longitudinal portion, said tab portion adapted to engage said interior end face of said adapter when said backstop is assembled on a reducer shaft to prevent said key from moving in said keyway in the direction of said exterior end face.

2. An improved backstop as set forth in claim 1 above, wherein said adapter is a tapered adapter.

3. An improved backstop as set forth in claim 1 above, wherein said shaft is the high speed input shaft of a reducer.

4. An improved backstop as set forth in claim 1 above, wherein said longitudinal portion of said key has a length greater than the length of the adapter to extend a predetermined length beyond said exterior end face of said adapter.

5. An improved backstop as set forth in claim 1 above, wherein said dog assemblies each include a spring member pivotally secured to said rotating hub and a dog rigidly secured to said spring members.

6. An improved backstop as set forth in claim 1 above, wherein said shaft includes a keyway with a tapered portion and said key includes a tapered portion for engaging said keyway tapered portion to prevent movement of the key in the keyway.

7. An improved backstop as set forth in claim 1 above, wherein said backstop includes a back cover plate and a front cover plate and said ratchet and rotating hub are received therebetween.

8. An improved backstop as set forth in claim 1 above, wherein said backstop is adapted to be mounted on the exterior of said reducer housing.

9. An improved backstop as set forth in claim 1, wherein said shaft is an intermediate reducer shaft.

10. An improved speed reducer with a backstop for preventing reversal of shaft rotation, said reducer comprising:

a gear reducer housing containing a high speed input shaft, a low speed output shaft and reduction gears therebetween;

a ratchet fixedly attached to said gear reducer housing and including a bore for receipt of the gear reducer high speed input shaft therethrough;

a rotating hub including a bore therethrough for receipt of said high speed reducer shaft therethrough, said hub including dog assemblies for engagement with said ratchet when said shaft is rotated in a predetermined reverse direction;

a tapered adapter for mounting said rotating hub onto said high speed shaft, said adapter including a keyway for receipt of a key therein, said adapter including an interior end face on the end of said adapter facing said reducer housing and an exterior end face on the opposite end; and a unitary key for securing said adapter for rotation with said high speed shaft, said key including a longitudinal portion extending in the direction of said shaft and a tab portion extending outwardly with respect to said shaft, said tab portion engaging said interior end face of said adapter to prevent said key from moving in said keyway in the direction of said exterior end face when said reducer is operated.

11. An improved speed reducer as in claim 10, wherein said longitudinal portion of said key has a length greater than the length of said adapter to extend a predetermined length beyond said exterior end face of said adapter.

12. An improved speed reducer as in claim 10, wherein said dog assemblies are arranged to engage said ratchet when said shaft attempts to reverse to prevent reversing thereto, and further wherein said dog assemblies move out of contact with said ratchet when said shaft is rotated in a predetermined forward direction as the speed increases.

13. An improved keyed adapter assembly for securing a component to a rotatable shaft, said adapter assembly comprising:

an adapter member including an interior end face and an opposite exterior end face, said adapter member including an outer surface for receipt of a component thereon and an internal bore for receipt of a rotatable shaft therethrough, said internal bore including a keyway therein; and a unitary key for securing said adapter for rotation with said rotatable shaft, said key including a longitudinal portion extending in the direction of said shaft, and a tab portion extending outwardly with respect to said longitudinal portion, said tab portion adapted to engage said interior end face of said adapter member when said adapter assembly is mounted on a shaft.

14. An improved keyed adapter assembly as in claim 13, wherein said adapter member is a tapered adapter.

15. An improved keyed adapter assembly as in claim 13, wherein said component is a backstop for preventing rotation of said shaft in a reverse direction.

16. An improved keyed adapter assembly as in claim 13, wherein said component is a pulley.

17. An improved keyed adapter assembly as in claim 13, wherein said component is a gear.

18. An improved keyed adapter assembly as in claim 13, wherein said longitudinal portion of said key has a length greater than the length of said adapter to extend a predetermined length beyond said exterior end face of said adapter.

19. An improved keyed adapter assembly as in claim 13, wherein said shaft includes a keyway with a tapered portion and said key includes a tapered portion for engaging said keyway tapered portion to prevent movement of the key in said keyway.

* * * * *